US005516076A

United States Patent [19]

Stobbs et al.

[11] Patent Number: 5,516,076

[45] Date of Patent: May 14, 1996

[54] ELECTROMAGNETIC INTERFACE FOR A LIQUID CONTROL VALVE

[75] Inventors: Thomas J. Stobbs, Brookfield; Gerald L. Depies, Cedar Grove; Allen L. Filo, Sussex; Daniel J. Lambert, Hubertus, all of Wis.

[73] Assignee: Applied Power Inc., Butler, Wis.

[21] Appl. No.: 258,045

[22] Filed: Jun. 10, 1994

[51] Int. Cl.[6] .......... F16K 31/06

[52] U.S. Cl. .......... 251/129.16; 251/129.15

[58] Field of Search .......... 251/129.16, 129.15

[56] References Cited

U.S. PATENT DOCUMENTS

| | | | |
|---|---|---|---|
| 2,358,828 | 9/1944 | Ray | 251/129.16 X |
| 3,523,556 | 8/1970 | Worrall | 251/129.16 X |
| 3,791,408 | 2/1974 | Saitou et al. | 251/129.15 X |
| 4,715,332 | 12/1987 | Kreuter | 251/129.16 X |
| 5,011,113 | 4/1991 | Stobbs et al. | 251/129.16 |
| 5,067,687 | 11/1991 | Patel et al. | 251/129.08 |
| 5,069,420 | 12/1991 | Stobbs et al. | 251/30.02 |
| 5,178,359 | 1/1993 | Stobbs et al. | 251/30.02 |

FOREIGN PATENT DOCUMENTS

| | | | |
|---|---|---|---|
| 3418654 | 11/1985 | Germany | 251/129.15 |

*Primary Examiner*—Stephen M. Hepperle
*Attorney, Agent, or Firm*—Quarles & Brady

[57] ABSTRACT

The magnetic interface between the housing and armature of a poppet type electromagnetically actuated fluid control valve creates a magnetic flux path through opposing axially and radially facing surfaces of the housing and armature to reduce the pull-in voltage of the valve at large axial gaps between the armature and housing.

3 Claims, 1 Drawing Sheet

ELECTROMAGNETIC INTERFACE FOR A LIQUID CONTROL VALVE

BACKGROUND OF THE INVENTION

FIELD OF THE INVENTION

This invention relates to electromagnetically actuated fluid control valves, and more particularly to the magnetic interface between a housing and armature of such a valve for reducing the voltage required to be applied to begin moving the armature (referred to herein as the pull-in voltage).

DISCUSSION OF THE PRIOR ART

Electromagnetically actuated fluid control valves such as the type described in U.S. Pat. No. 5,011,113 are well known. In such valves, an electromagnetic actuator, usually an electrical coil, produces a magnetic field through the valve housing which acts on an armature of the valve. The armature is moveable relative to the valve housing so as to change the state of the valve, i.e., to either change it from being closed to open, open to closed, or change the degree of being open.

As described in U.S. Pat. No. 5,011,113, electromagnetic valves have been applied to automobiles and in particular to suspension control systems for automobiles. These are usually 12 volt DC systems, being operated by an automotive 12 volt DC battery. Under certain circumstances, such as if the voltage of the battery has deteriorated, or if heavy electrical loading occurs in the system, the voltage available to operate such valves has been insufficient. This being the case, it is desirable to provide a valve which can be operated at reduced pull-in voltages.

SUMMARY OF THE INVENTION

The invention provides a structure for a magnetic interface between the housing and armature of an electrically actuated fluid control valve. A magnetic interface between a valve-housing and a relatively moveable valve armature of the invention includes a pair of opposing axially facing surfaces and a pair of opposing radially facing surfaces. One of each of the axial and radial surfaces are on the housing and intersect one another and the opposing axial and radial surfaces are on the armature and intersect one another. This construction reduces the pull-in voltage of the valve for relatively large axial gaps between the armature and housing, so that the valve will respond to lower voltages.

In another useful aspect, at least one of the axial surfaces is formed by a land which projects toward the opposing axially facing surface, to reduce hydraulic lock effects which tend to hold the armature and housing together in an extreme position. Preferably, this land is formed on the armature.

In an especially preferred form, the invention is applied to a fluid control valve of the type having a popper slidably mounted in a bore of the housing. The popper has an axial central bore with a sealing end adjacent to valve inlet ports for seating against a valve seat in a closed position and a closed end adjacent to the coil and with radial bores in the popper to provide communication with outlet ports of the valve. A cap member is secured to the coil end of the housing and means bias the poppet in an extreme position relative to the housing. An actuator which is responsive to an input current produces a magnetic flux path passing through an armature to move the poppet away from said extreme position. The cap member forms a recess and the armature extends axially into the recess, thereby creating axially and radially opposing surfaces on the cap and armature through which said flux path passes.

DETAILED DESCRIPTION OF THE PREFERRED EMBODIMENTS

Figure 1:
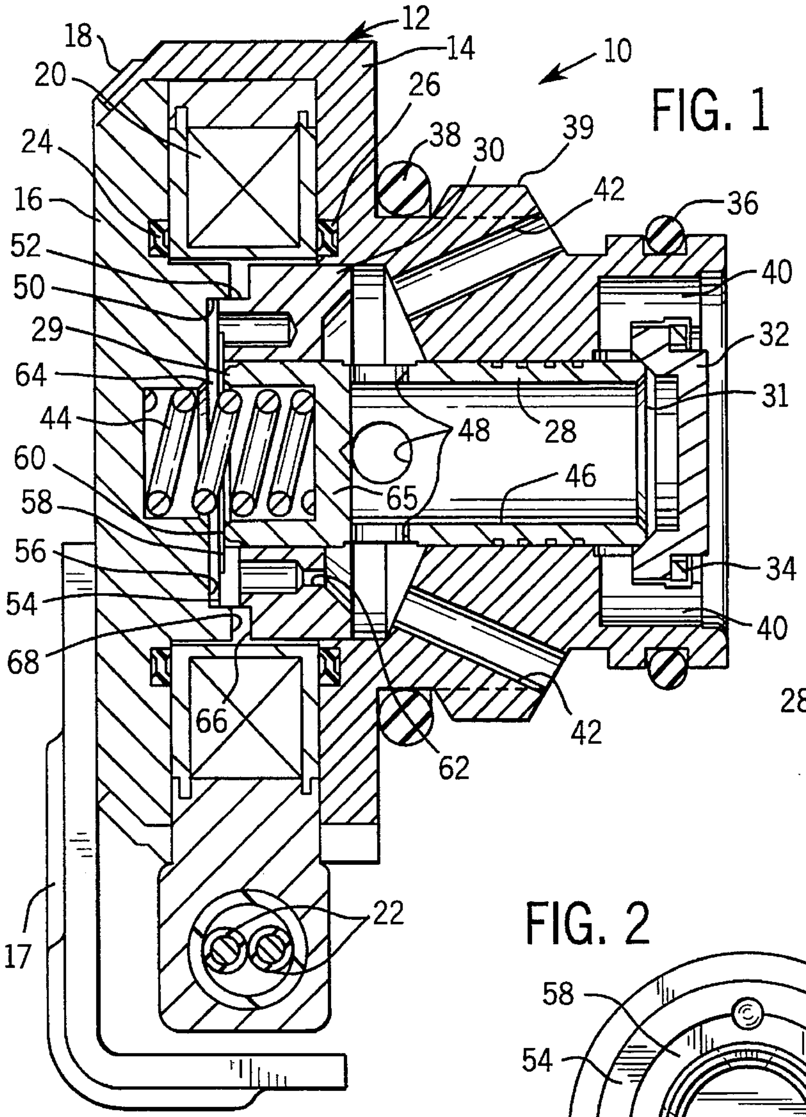
FIG. 1 is a cross-sectional view of a valve incorporating the invention.

Referring to FIG. 1, a valve 10 of the present invention includes a housing 12 which is provided by a body 14 and a cap 16 which is secured to the body 14 by an annular crimp 18 and has a shielding (from rocks, etc.) bracket 17 extending therefrom. The valve 10 also includes an actuator coil 20 supplied with current by wires 22, ring seals 24 and 26 sealing the interface between the coil 20 and the cap 16 and body 14, a poppet 28 and an armature 30 press-fit onto the coil end 29 of the poppet 28.

Adjacent to the opposite or sealing end 31 of the poppet 28, a seat 32 provides a frusto-conical surface against which the sealing end of the popper 28 seats in the closed position of the valve 10 as shown in FIG. 1. The seat 32 is retained in the body 14 by an internal snap ring 34 which is received in an internal groove of the body 14. The valve 10 also includes O-rings 36 and 38 which seal the valve in its receiving bore, for example, in a bore of a suspension damper in which the valve 10 is received. Male threads 39 on the body 14 mate with female threads in the receiving bore to secure the valve 10 therein.

Ports 40 provide inlets to the valve 10 and ports 42 provide outlets. A spring 44 biases the sealing end of the poppet 28 against seat 32, so the valve 10 is a normally closed valve, although the invention could also be applied to a normally open valve.

Briefly, when a voltage is applied to the coil 20 via wires 22, coil 20 generates an electromagnetic field which acts primarily between the cap 16 and the armature 30 to pull the armature 30, and therefore the popper 28 fixed thereto, rightwardly as shown in FIG. 1 so as to lift the sealing end 31 of poppet 28 off of seat 32, thereby opening the valve by creating a flow path from inlet ports 40 to outlet ports 42 through bore 46 and cross-bores 48 in poppet 28. When the voltage is relieved, spring 44 returns the poppet 28 to its normally closed position in which it is seated against seat 32, thereby closing the valve.

The valve 10 is substantially the same as the valve described in U.S. Pat. No. 5,011,113, the disclosure of which is hereby incorporated by reference, except as otherwise stated herein. The main differences between the valve disclosed in U.S. Pat. No. 5,011,113 and the valve 10 are at the coil end (the right end as viewed in FIG. 1) interface between the armature 30 and the cap 16.

Whereas the magnetic interface disclosed in U.S. Pat. No. 5,011,113 has flat opposing axially facing surfaces, in the magnetic interface of the valve 10, the cap 16 is recessed with a bore 50 and the armature 30 has a reduced diameter section 52 which fits into the bore 50. In addition to opposing axially facing surfaces 54 and 56, this construction adds to the armature-housing magnetic interface oppositely facing radial surfaces in close proximity with one another, i.e., the interior cylindrical surface of the bore 50 facing the exterior cylindrical surface of the section 52, which create a magnetic flux path through them. Preferably these radially facing surfaces 50 and 52 are in close proximity to one another. In the preferred embodiment, the spacing between the radially facing surfaces 50 and 52 is nominally 0.005 inches. The result is that for larger gaps between the axially facing surfaces 54 and 56, such as the gap which exists when the sealing end 31 of the poppet 28 is against the seat 32 (e.g., nominally 0.020 inches), a lower voltage is required to be applied to the coil 20 to begin opening the valve 10.

When opening the valve 10, as the surface 54 approaches the surface 56 the voltage required to further open the valve 10 increases and at some point the voltage required to further open the valve 10 would be greater than the voltage required at the same opening with the interface disclosed in U.S. Pat. No. 5,011,113. However, for larger gaps such as when the poppet 28 is closed against seat 32 and for small openings between the poppet and seat, the pull-in voltage is less for a construction of the present invention than it is for the construction of U.S. Pat. No. 5,011,113.

Preferably, the surface 54 is provided on an annular land which projects toward the surface 56, so as to reduce the surface area of contact between the armature 30 and the cap 16 in the fully opened position, thereby reducing hydraulic lock effects which tend to hold the valve 10 open. As can be seen in FIG. 1, surface 58 of the armature 30 and end surface 60 of the poppet 28 are recessed from the surface 54 so that under no circumstances would they contact the surface 56 on the cap 16. In addition, only one inlet orifice 62 to damping chamber 64 may be provided, and the orifice 62 may be suitably sized, to provide any desired transition speed for the poppet 28 when changing states. It is noted that in the valve 10, as in the valve disclosed in U.S. Pat. No. 5,011,113, a pressure wall 65 prevents direct communication between the bore 46 and the damping chamber 64.

It is also noted that armature 30 and cap 16 have annular axially facing surfaces 66 and 68, however, preferably the spacing between these surfaces is so great that any magnetic effects between them are negligible or non-existent.

Figure 3:
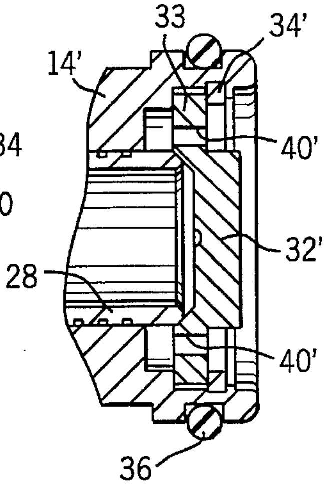
FIG. 3 is a fragmentary view of an alternate embodiment of the invention.
Figure 2:
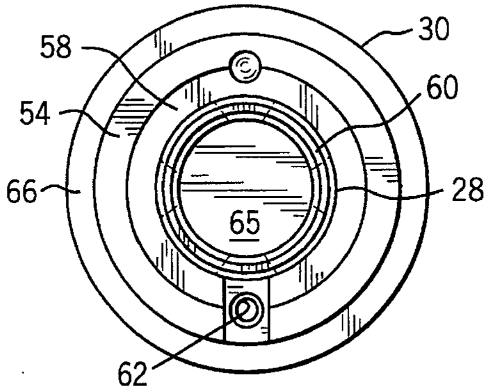
FIG. 2 is a plan view of the right end of the armature and popper assembly for the valve as viewed in FIG. 1.

An alternate body 14', seat 32' and snap ring 34' which could be used to make the valve 10 are illustrated in FIG. 3. All other parts of the valve 10 would remain the same As shown in FIG. 3, the seat 32' is formed with an enlarged flange 33 in which is formed the inlet ports 40'. Snap ring 34' secures seat 32' in a bore formed in body 14', which is enlarged to receive the flange 33. This arrangement reduces the complexity of the machining operations needed to form the inlet ports 40', versus the ports 40.

Figure 4:
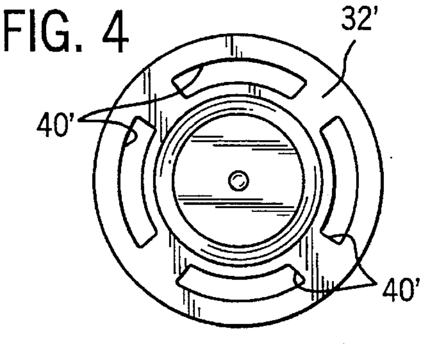
FIG. 4 is a front plan view of a seat for the embodiment shown in FIG. 3.
Figure 5:
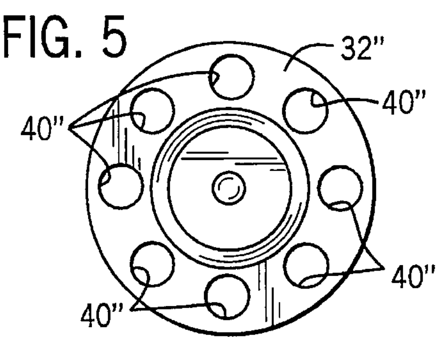
FIG. 5 is a front plan view of an alternate seat for the embodiment of FIG. 3.

The shape of the ports 40' is shown in FIG. 4 as being generally rectangular. However, the shape could alternatively be as shown in the seat 32" of FIG. 5, which has cylindrical ports 40".

Preferred embodiments of the invention have been described in considerable detail. Numerous modifications and variations to these embodiments will be apparent to those skilled in the art but which will still incorporate the invention. For example, the armature and poppet or the cap and body could be made integral with one another or with other boundaries Therefore, the invention should not be limited to the preferred embodiment described, but should be defined by the claims which follow.

We claim:

1. A fluid control valve, comprising:

a housing having a bore and inlet and outlet ports in communication with the bore;

a popper slidably mounted in the bore, the popper having a sealing end, a coil end and a longitudinal central bore open at the sealing end which extends toward the coil end and terminates in a pressure wall; and a radial cross-bore providing fluid communication between the central bore and the outlet port;

a valve seat sized to seat against the sealing end of the poppet and prevent fluid communication between the inlet port and the central bore when the sealing end of the poppet is in contact with the valve seat;

a cap secured to the housing;

means for biasing the popper in an extreme position relative to the housing;

an armature fixed to said popper for moving said popper and having at one end thereof a reduced diameter portion;

an actuator operated by an input current to produce a magnetic flux path passing through the armature to move said poppet away from said extreme position;

wherein said cap forms a recess and said reduced diameter portion of said armature extends axially into said recess so as to create axially and radially opposing surfaces on said cap and on said reduced diameter portion of said armature in close proximity to one another through which said flux path passes.

2. The improvement of claim 1, wherein said axially opposing surfaces are defined by at least one land which projects from one of the axially opposing surfaces toward the other axially opposing surface.

3. The improvement of claim 2, wherein said land is formed on said armature.

* * * * *

UNITED STATES PATENT AND TRADEMARK OFFICE

CERTIFICATE OF CORRECTION

Patent No. : 5,516,076
Dated : May 14, 1996

Inventors : Thomas J. Stobbs, et al.

It is certified that error appears in the above-identified patent and that said Letters Patent is hereby corrected as shown below:

Col. 1, line 56, change "popper" to --poppet--.

Col. 1, line 57, change "popper" to --poppet--.

Col. 1, line 61, change "popper" to --poppet--.

Col. 2, line 10, change "popper" to --poppet--.

Col. 2, line 32, change "popper" to --poppet--.

Col. 2, line 49, change "popper" to --poppet--.

Col. 3, line 49, after "same", add a period --.--.

Col. 4, line 20 (claim 1), change both occurrences of "popper" to --poppet--.

Col. 4, line 31 (claim 1), change "popper" to --poppet--.

UNITED STATES PATENT AND TRADEMARK OFFICE

CERTIFICATE OF CORRECTION

PATENT NO. : 5,516,076

DATED : May 14, 1996

INVENTOR(S) : Thomas J. Stobbs, et al.

It is certified that error appears in the above-indentified patent and that said Letters Patent is hereby corrected as shown below:

Col. 4, line 33 (claim 1), change both occurrences of "popper" to --poppet--.

Signed and Sealed this

Thirtieth Day of July, 1996

Attest:

BRUCE LEHMAN

*Attesting Officer* *Commissioner of Patents and Trademarks*